(12) United States Patent
Zanrosso et al.

(10) Patent No.: US 7,482,608 B2
(45) Date of Patent: Jan. 27, 2009

(54) NUCLEAR POWERED QUANTUM DOT LIGHT SOURCE

(75) Inventors: Eddie Michael Zanrosso, Pasadena, CA (US); James Michael Horn, Jefferson, WI (US)

(73) Assignee: Iso-Science Laboratories, Inc., Valencia, CA (US)

( * ) Notice: Subject to any disclaimer, the term of this patent is extended or adjusted under 35 U.S.C. 154(b) by 456 days.

(21) Appl. No.: 11/406,665

(22) Filed: Apr. 18, 2006

(65) Prior Publication Data

US 2006/0261325 A1    Nov. 23, 2006

Related U.S. Application Data

(60) Provisional application No. 60/673,158, filed on Apr. 20, 2005.

(51) Int. Cl.
*G21G 4/00* (2006.01)
(52) U.S. Cl. .................. 250/493.1; 250/494.1
(58) Field of Classification Search ... 250/493.1–504 H
See application file for complete search history.

(56) References Cited

U.S. PATENT DOCUMENTS

| | | | |
|---|---|---|---|
| 6,501,091 B1 * | 12/2002 | Bawendi et al. | 257/14 |
| 6,864,501 B2 * | 3/2005 | Shields et al. | 257/13 |
| 6,890,777 B2 * | 5/2005 | Bawendi et al. | 438/22 |
| 6,914,265 B2 * | 7/2005 | Bawendi et al. | 257/98 |
| 6,960,779 B2 * | 11/2005 | Shields et al. | 257/13 |
| 7,019,333 B1 * | 3/2006 | Shields et al. | 257/97 |
| 7,087,923 B2 * | 8/2006 | Ward et al. | 257/22 |
| 7,132,676 B2 * | 11/2006 | Shields et al. | 257/14 |
| 7,318,651 B2 * | 1/2008 | Chua et al. | 362/11 |
| 2002/0196827 A1 * | 12/2002 | Shields et al. | 372/45 |
| 2003/0127608 A1 * | 7/2003 | Shields et al. | 250/493.1 |
| 2003/0127659 A1 * | 7/2003 | Bawendi et al. | 257/89 |
| 2003/0127660 A1 * | 7/2003 | Bawendi et al. | 257/89 |
| 2003/0218143 A1 * | 11/2003 | Shields et al. | 250/493.1 |
| 2005/0135079 A1 * | 6/2005 | Yin Chua et al. | 362/12 |
| 2005/0161660 A1 * | 7/2005 | Ward et al. | 257/13 |

* cited by examiner

*Primary Examiner*—Jack I Berman
*Assistant Examiner*—Andrew Smyth
(74) *Attorney, Agent, or Firm*—Christie, Parker & Hale, LLP.

(57) ABSTRACT

A nuclear powered quantum dot light source, having a holder having at least a portion that is a radiolucent and a mixture of quantum dots, a radionuclide, and a radiolucent binder material into which the quantum dots and radionuclide are located. Alpha and/or beta particles from the radionuclide energize the quantum dots and cause them to give off light at one or more predetermined wavelengths.

33 Claims, 2 Drawing Sheets

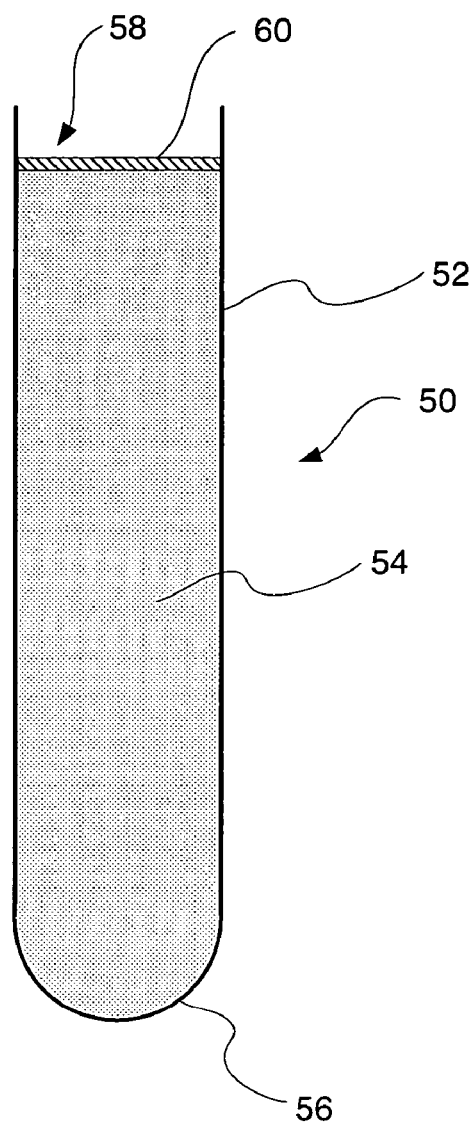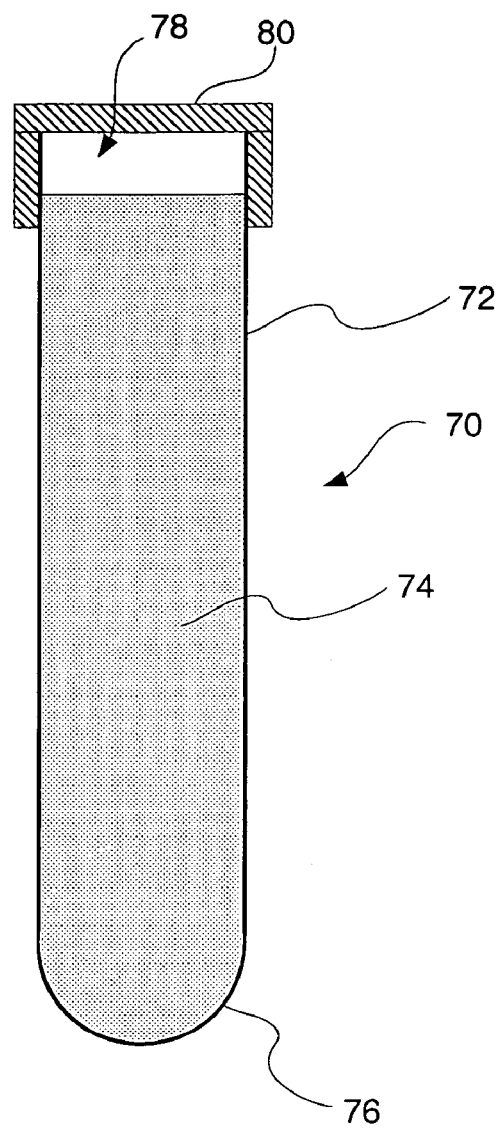
FIG. 3　　　　FIG. 4

NUCLEAR POWERED QUANTUM DOT LIGHT SOURCE

CROSS-REFERENCE TO RELATED APPLICATIONS

This application claims the benefit of provisional patent application No. 60/673,158, filed on Apr. 20, 2005.

BACKGROUND

Quantum dots are semiconductor nanocrystals ranging from nanometers in size to a few microns. The size controls the number of electrons contained in the dot. Each quantum dot can contain from one to several thousand electrons. Since quantum dots are so small, quantum mechanical effects force the electron energy levels to be quantized. Quantum dots have sometimes been called artificial atoms because the electron quantum levels contained within a dot are similar to the electron orbitals in an atom.

This quantization allows distinct wavelength (colors) of light to be emitted. Light or electric current typically excites them. The light emitted ranges from ultraviolet to visible to infrared, depending on the material and the size. This is a wavelength span of 350 to 2300 nanometers. The emission has a very narrow bandwidth of 30 nanometers, full width at half maximum (FWHM). Work is being conducted on using quantum dots as a replacement for LEDs.

In addition to semiconductors, quantum dots can be made from metal. Presently, quantum dots are made by vacuum techniques such as molecular beam epitaxy (MBE) or chemical vapor deposition (CVD), or in aqueous solutions where a colloid is formed. Other techniques may be developed. Cadmium selenide (CdSe) is a common material for visible light quantum dots. A 3 nanometer CdSe dot emits 520-nanometer light that is green. Increasing the diameter to 5.5 nanometers increases the wavelength to 630 nanometers, the wavelength of red light. Quantum dots can be "tuned" by controlling their size to have any desired pure color of a desired wavelength. Other phosphors suitable for quantum dots include doped zinc sulfide (ZnS) compounds. Gold quantum dots have also been made. CdSe quantum dots may be coated with ZnS as a protective layer.

Quantum dots are commercially available from companies such as Evident Technologies of Troy, N.Y. Quantum dots have a myriad of applications, including medical applications for tagging proteins and antibodies. The quantum dots fluoresce to map the proteins and antibodies. Other uses of quantum dots include photovoltaic solar cells, electroluminescent devices, the phosphorous of LED lights, thermoelectrics, inks, pigments and anti-counterfeiting materials, to mention just a few areas of current research and development.

Quantum dots have been proven to be radiation resistant. It would therefore be advantageous if energy, namely alpha or beta particles from nuclear sources, could be utilized as the energy source to energize quantum dots for use in light sources having precise wavelengths and intensities, which precise light sources could be used, for example, to calibrate light sources. Other uses of these quantum dots include their uses in calibrating detector equipment such as ATP luminometers used for measuring the presence of ATP in swab samples, etc.

SUMMARY OF THE INVENTION

The company Isotope Products Laboratories, of Valencia, Calif., currently supplies light sources using alpha and beta emitters as light calibration sources. Presently, scintillator manufacturers have a limited choice of wavelengths available. Quantum dots excited by alpha particles or beta particles would provide a light source with precise wavelengths ranging from the infrared to ultraviolet light. Besides permitting light sources to be made having a predetermined, single wavelength, such light sources could also, for example, allow multiple wavelengths of light to be emitted by using combinations of quantum dots. This is not currently available.

Such light sources could be used as calibration sources for instruments using photomultiplier tubes or PIN photodiodes. Scintillator light sources are used in bacteria contamination detection systems, such as in ATP luminometers. Brighter light sources can be used to illuminate gun sights replacing fragile glass tubes containing tritium.

The use of scintillator material limits the available plastic matrix to polyvinyltoluene (PVT). PVT is a delicate plastic whose surface is damaged by finger prints. However, with quantum dots, other plastics such as epoxy, various resins, and silicone can be used. Quantum dots can even be embedded in glasses. Light sources can be made using techniques such as spray coating or screen-printing. Spin or dip coating can also form films. Ink jet systems can also be used for film deposition.

Quantum dots having desired qualities, (e.g., selected wavelength of light produced and intensity) can be combined in close association or proximity with one or more types of radionuclides in a matrix of optically translucent or transparent material.

More particularly, one or more types of quantum dots that produce light of one or more desired wavelengths, respectively, are mixed into a translucent or transparent matrix, e.g., cured UV resin, air cured resins, along with one or more types of radionuclides. The radionuclides emit either alpha or beta particles. Examples of beta radiation emitting radionuclides include, but are not limited to, hydrogen 3 (tritium, or $^3$H), carbon 14 ($^{14}$C), silicon 32 ($^{32}$Si), nickel 63 ($^{63}$Ni), and thallium 204 ($^{204}$Tl). Examples of alpha radiation emitting radionuclides include, but are not limited to, polonium 210 ($^{210}$Po), americium 241 ($^{241}$Am) and thorium 232 ($^{232}$Th). The radionuclide(s) will provide energy, in the form of emitted alpha or beta particles, which will energize the quantum dots and cause them to emit light at the desired wavelength(s) and intensity.

BRIEF DESCRIPTION OF THE DRAWINGS

These and/or other aspects and advantages of the invention will become apparent and more readily appreciated from the following description of the embodiments, taken in conjunction with the accompanying drawings.

FIG. 3 is a side view of another exemplary nuclear powered quantum dot light source.

FIG. 4. is a side view of yet another exemplary nuclear powered quantum dot light source.

DETAILED DESCRIPTION OF THE INVENTION

Figure 1:
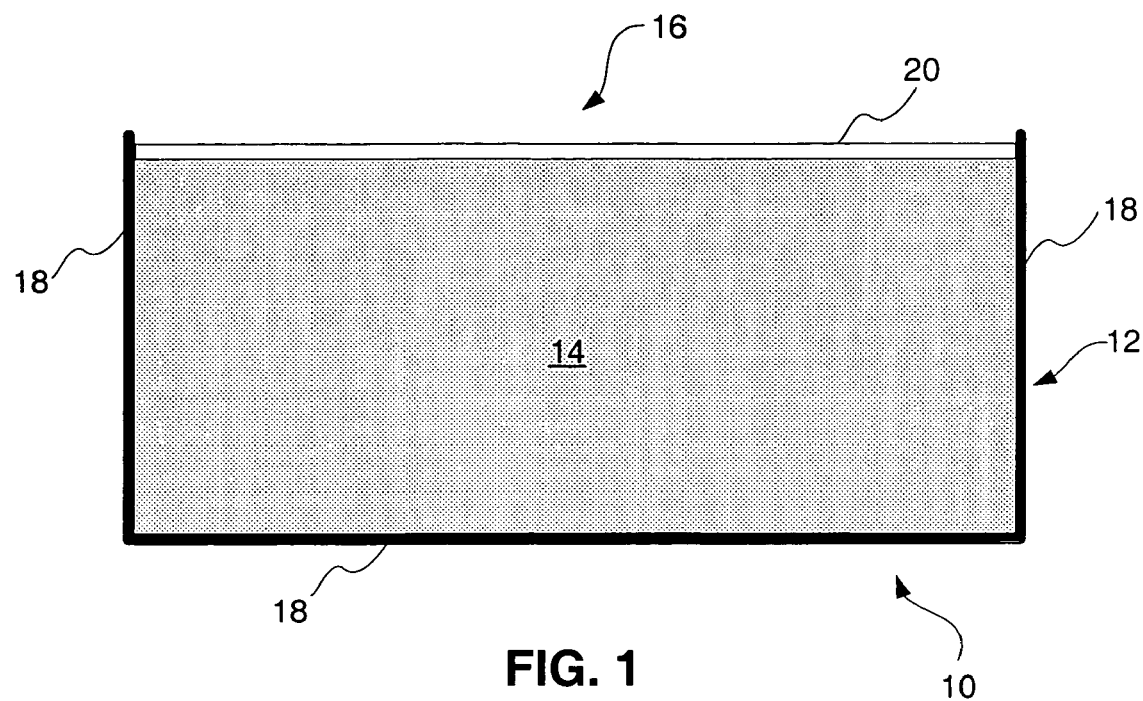
FIG. 1 is a side view of an exemplary nuclear powered quantum dot light source.

Turning first to FIG. 1, there is shown a side view of an exemplary nuclear powered quantum dot light source 10. The exemplary nuclear powered quantum dot light source 10 preferably has a container 12 in which is located a quantum dot and radionuclide containing matrix 14. The container 12 can be formed in a desired size and shape, e.g., disk shaped, box shaped, etc., and of a desired material, such as metal, plastic, glass, etc. The container 12 has at least one side 16 which is open or light transmissive, with other sides 18 being opaque if desired. The sides 18 could be made to be reflective (e.g. mirrored) so that the light generated by the energized quantum dots is more efficiently reflected out of the container. A layer of material 20 not containing radioisotopes or quantum dots can optionally be provided over the at least one side 16. The layer of material 20 is made of clear or light transmissive material, such as a UV curable resin and can be provided to help ensure that physical human contact with any radioisotopes is eliminated. In addition or alternately, the entire container 12 can be encapsulated within a nonradioactive envelope.

Figure 2:
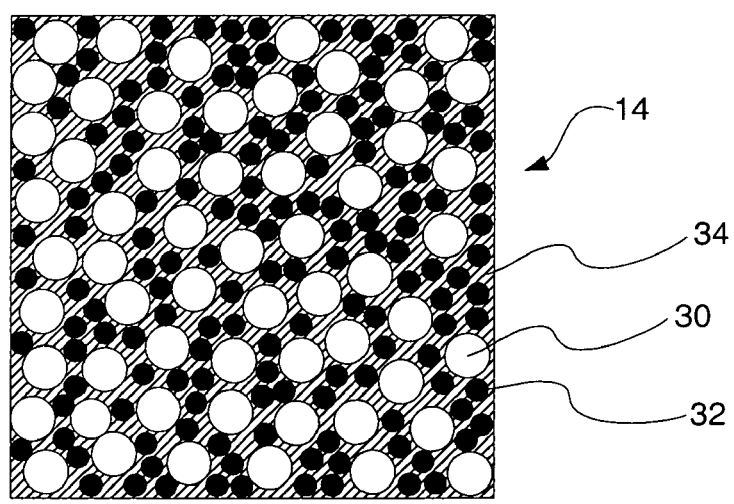
FIG. 2 is a diagrammatic representation of an exemplary matrix containing quantum dots and radionuclides.

FIG. 2 is a diagrammatic and simplified representation of the exemplary matrix 14 containing quantum dots 30 and radionuclides 32 contained in a matrix material 34, such as a UV cured resin. Some other materials can include thermal sol-gel hybrids, UV sol-gel hybrids and plastic resins such as polycarbonate, polystyrene, PMMA (polymethylmethacrylate), and polyethylene.

The ratio of the quantum dots 30 to radionuclide(s) 32 in the matrix material 34 can be determined as is required. The quantum dots are sized and engineered to produce light with a wavelength span of 350 to 2300 nanometers (ultraviolet to visible to infrared), with the size and material of the quantum dots determining the wavelength emitted. One or more different types of quantum dots can be used to provide either light at a single wavelength, or if desired, multiple wavelengths. The radionuclides 32 can be selected from radionuclides that emit either alpha or beta particles. Examples of beta radiation emitting radionuclides include, but are not limited to hydrogen 3 (tritium, or $^3$H), carbon 14 ($^{14}$C), silicon 32 ($^{32}$Si), nickel 63 ($^{63}$Ni), and thallium 204 ($^{204}$Tl). Examples of alpha radiation emitting radionuclides include, but are not limited to, polonium 210 ($^{210}$Po), americium 241 ($^{241}$Am) and thorium 232 ($^{232}$Th). The radionuclide(s) will provide energy, in the form of emitted alpha or beta particles, that will energize the quantum dots and cause them to emit light at the desired wavelength(s) and intensity. FIG. 2 is provided as a simplified representation, but in actual construction, the amount of radionuclides relative to the number of quantum dots, and the concentrations of the radionuclides and radionuclides in the matrix will be selected so that the quantum dots are adequately energized and emit light of the proper wavelength and intensity.

FIG. 3 is a side view of another exemplary nuclear powered quantum dot light source 50. In this embodiment, the nuclear powered quantum dot light source 50 is adapted for use in devices such as ATP luminometers, and comprises a test tube shaped holder 52 which contains a quantum dot containing matrix 54. The test tube shaped holder 52 has a sealed bottom 56 and an open top 58. A cap 60 is made of a radiolucent transparent material, such as most plastics and some glasses, and is used to seal off the holder 52 with the quantum dot containing matrix 54 contained therein, and prevents direct human contact with the quantum dot containing matrix 54.

FIG. 4 is a side view of yet another exemplary nuclear powered quantum dot light source 70 that is similar to holder 50 of FIG. 3. This embodiment of nuclear powered quantum dot light source 70 comprises a test tube shaped holder 72 which contains a quantum dot containing matrix 74. The test tube shaped holder 72 has a sealed bottom 76 and a top 78 that is sealed off with a cap 80. Depending on the requirements, the cap 80 can be made of a radiolucent material and will seal off the holder 52 with the quantum dot containing matrix 54 therein, and thereby prevent direct human contact with the quantum dot containing matrix 54.

With respect to all the holders discussed above, if desired, it is possible for the holders to have walls formed entirely of radiolucent material.

Lastly, although all the embodiments are shown having a holder, it is possible to form the light source without a holder, such as by extruded or cast the material without a container. Such as use might be appropriate, for example, where the light source is placed in another device.

Having thus described the exemplary embodiments of the present invention, it should be understood by those skilled in the art that the above disclosures are exemplary only and that various other alternatives, adaptations, and modifications may be made within the scope of the present invention. The presently disclosed embodiment is to be considered in all respects as illustrative and not restrictive. The scope of the invention being indicated by the appended claims rather than the foregoing description, and all changes which come within the meaning and range of equivalency of the claims are, therefore, intended to be embraced therein.

We claim:

1. A nuclear powered quantum dot light source, comprising:
   quantum dots; and
   a radionuclide.

2. The nuclear powered quantum dot light source of claim 1, further comprising a material into which the quantum dots and the radionuclide are located.

3. The nuclear powered quantum dot light source of claim 2, wherein the material is radiolucent.

4. The nuclear powered quantum dot light source of claim 2, wherein the material comprises one or more of a radiolucent solid, a radiolucent liquid, a radiolucent gel, and/or a sol-gel hybrid.

5. The nuclear powered quantum dot light source of claim 2, wherein the material comprises one or more of a thermal sol-gel hybrid, a UV sol-gel hybrid, a plastic resin, polycarbonate, polystyrene, polymethylmethacrylate), and/or polyethylene.

6. The nuclear powered quantum dot light source of claim 1, further comprising a holder into which the quantum dots and radionuclide are placed, the holder comprising at least a portion that is radiolucent.

7. The nuclear powered quantum dot light source of claim 6, wherein the holder comprises radiolucent side walls.

8. The nuclear powered quantum dot light source of claim 1, wherein the quantum dots are selected to give off light at a single, predetermined wavelength when energized by the radionuclide.

9. The nuclear powered quantum dot light source of claim 8, wherein the single, predetermined wavelength can be in or out of the visible light spectrum.

10. The nuclear powered quantum dot light source of claim 1, wherein the quantum dots comprise a plurality of different types of quantum dots that are selected to give off light at a plurality of predetermined wavelengths when energized by the radionuclide.

11. The nuclear powered quantum dot light source of claim 10, wherein the plurality of predetermined wavelength can be selected to be in and/or out of the visible light spectrum.

12. The nuclear powered quantum dot light source of claim 1, wherein the radionuclide is a single type of a radionuclide that emits either alpha or beta particles.

13. The nuclear powered quantum dot light source of claim 1, wherein the radionuclide comprises a plurality of different types of radionuclides.

14. The nuclear powered quantum dot light source of claim 1, wherein the radionuclide is selected from the group consisting of hydrogen 3 ($^3$H), carbon 14 ($^{14}$C), silicon 32 ($^{32}$Si), nickel 63 ($^{63}$Ni), thallium 204 ($^{204}$Tl), polonium 210 ($^{210}$Po), americium 241 ($^{241}$Am) and thorium 232 ($^{232}$Th).

15. The nuclear powered quantum dot light source of claim 13, wherein the radionuclides comprise a plurality of different radionuclides selected from the group consisting of hydrogen 3 ($^3$H), carbon 14 ($^{14}$C), silicon 32 ($^{32}$Si), nickel 63 ($^{63}$Ni), thallium 204 ($^{204}$Tl), polonium 210 ($^{210}$Po), americium 241 ($^{241}$Am) and thorium 232 ($^{232}$Th).

16. The nuclear powered quantum dot light source of claim 1, wherein the quantum dots comprises CdSe and are coated with ZnS as a protective layer.

17. A nuclear powered quantum dot light source, comprising:
    a holder having at least a portion that is a radiolucent;
    a mixture comprising quantum dots, a radionuclide, and a radiolucent material into which the quantum dots and radionuclide are located.

18. The nuclear powered quantum dot light source of claim 17, wherein the radiolucent material comprises a radiolucent solid, a radiolucent liquid, a radiolucent gel, and/or a sol-gel hybrid.

19. The nuclear powered quantum dot light source of claim 17, wherein the radiolucent material comprises one or more of a thermal sol-gel hybrid, a UV sol-gel hybrid, a plastic resin, polycarbonate, polystyrene, polymethylmethacrylate), and/or polyethylene.

20. The nuclear powered quantum dot light source of claim 17, wherein the quantum dots are selected to give off light at a single, predetermined wavelength when energized by the radionuclide.

21. The nuclear powered quantum dot light source of claim 20, wherein the single, predetermined wavelength can be in or out of the visible light spectrum.

22. The nuclear powered quantum dot light source of claim 16, wherein the quantum dots comprise a plurality of different types of quantum dots that are selected to give off light at a plurality of predetermined wavelengths when energized by the radionuclide.

23. The nuclear powered quantum dot light source of claim 22, wherein the plurality of predetermined wavelength can be selected to be and/or out of the visible light spectrum.

24. The nuclear powered quantum dot light source of claim 17, wherein the radionuclide is a single type of a radionuclide that emits either alpha or beta particles.

25. The nuclear powered quantum dot light source of claim 17, wherein the radionuclide comprises a plurality of different types of radionuclides.

26. The nuclear powered quantum dot light source of claim 17, wherein the radionuclide is selected from the group consisting of hydrogen 3 ($^3$H), carbon 14 ($^{14}$C), silicon 32 ($^{32}$Si), nickel 63 ($^{63}$Ni), thallium 204 ($^{204}$Tl), polonium 210 ($^{210}$Po), americium 241 ($^{241}$Am) and thorium 232 ($^{232}$Th).

27. The nuclear powered quantum dot light source of claim 25, wherein the radionuclides comprises a plurality of different radionuclides selected from the group consisting of hydrogen 3 ($^3$H), carbon 14 ($^{14}$C), silicon 32 ($^{32}$Si), nickel 63 ($^{63}$Ni), thallium 204 ($^{204}$Tl), polonium 210 ($^{210}$Po), americium 241 ($^{241}$Am) and thorium 232 ($^{232}$Th).

28. A nuclear powered quantum dot light source, comprising:
    a holder comprising a radiolucent outer wall;
    a radionuclide that is either of a single type or a plurality of types, the single radionuclide or plurality of types of radionuclides emitting alpha and/or beta particles;
    quantum dots that are selected to give off light at a single, predetermined wavelength or a plurality of wavelengths when energized by the radionuclide;
    a radiolucent material in which the radionuclide and quantum dots are mixed, the mixture of the radiolucent material, radionuclide and quantum dots being placed in the holder,
    wherein the radionuclide energizes the quantum dots to cause them to give off light at the desired predetermined wavelength or a plurality of wavelengths.

29. The nuclear powered quantum dot light source of claim 28, wherein the radiolucent material comprises a radiolucent solid, a radiolucent liquid, a radiolucent gel, and/or a sol-gel hybrid.

30. The nuclear powered quantum dot light source of claim 28, wherein the radiolucent material comprises a radiolucent resin.

31. The nuclear powered quantum dot light source of claim 28, wherein the emitted light can be in or out of the visible light spectrum.

32. The nuclear powered quantum dot light source of claim 28, wherein the radionuclide is selected from the group consisting of hydrogen 3 ($^3$H), carbon 14 ($^{14}$C), silicon 32 ($^{32}$Si), nickel 63 ($^{63}$Ni), thallium 204 ($^{204}$Tl), polonium 210 ($^{210}$Po), americium 241 ($^{241}$Am) and thorium 232 ($^{232}$Th).

33. The nuclear powered quantum dot light source of claim 28, wherein the quantum dots comprises CdSe and are coated with ZnS as a protective layer.

\* \* \* \* \*